United States Patent [19]

Mertes

[11] Patent Number: 4,892,996
[45] Date of Patent: Jan. 9, 1990

[54] THERMOSTATICALLY CONTROLLED IN-LINE DIESEL FUEL HEATER USING A BIMETAL DISC THERMOSTAT

[75] Inventor: James L. Mertes, Altadena, Calif.

[73] Assignee: TRW Technar Inc., Irwindale, Calif.

[21] Appl. No.: 220,409

[22] Filed: Jul. 19, 1988

Related U.S. Application Data

[63] Continuation of Ser. No. 89,227, Aug. 25, 1987, abandoned.

[51] Int. Cl.⁴ .......................... H05B 1/02; F24H 1/10; F02M 31/00; H01H 37/04
[52] U.S. Cl. ..................................... 219/301; 123/549; 123/557; 138/38; 219/205; 219/308; 219/512; 337/365; 431/208
[58] Field of Search .................. 123/549, 557; 138/38; 219/296–299, 301, 308, 205–208, 512; 431/208; 337/365, 380, 381, 398

[56] References Cited

U.S. PATENT DOCUMENTS

| | | | |
|---|---|---|---|
| 2,667,553 | 1/1954 | Moorhead et al. | 337/365 |
| 2,895,508 | 7/1959 | Drake | 138/38 |
| 4,208,570 | 6/1980 | Rynard | 219/208 |
| 4,213,433 | 7/1980 | Day | 261/142 |
| 4,297,668 | 10/1981 | Place | 337/365 |
| 4,424,422 | 1/1984 | Bell et al. | 123/549 X |

Primary Examiner—Anthony Bartis
Attorney, Agent, or Firm—Christie, Parker & Hale

[57] ABSTRACT

A fuel heater adapted to mount in series with a diesel engine fuel line comprises a metal pipe having a resistance heater wound around a first straight portion of the pipe containing a fluid deflector dividing the first portion into a plurality of fluid passages. A U-shaped bend is formed in a second portion of the pipe upstream from the heater. The pipe is flattened to less than half the normal diameter of the pipe in the bight of the U-shaped portion and a bimetal disk thermostatic switch is mounted on the flattened wall of the pipe. When the ambient temperature of the fuel is below a predetermined temperature and is flowing through the flattened pipe, the switch activates the heater, but if the fuel stops flowing or increases in ambient temperature, the switch cuts off the heater.

6 Claims, 1 Drawing Sheet

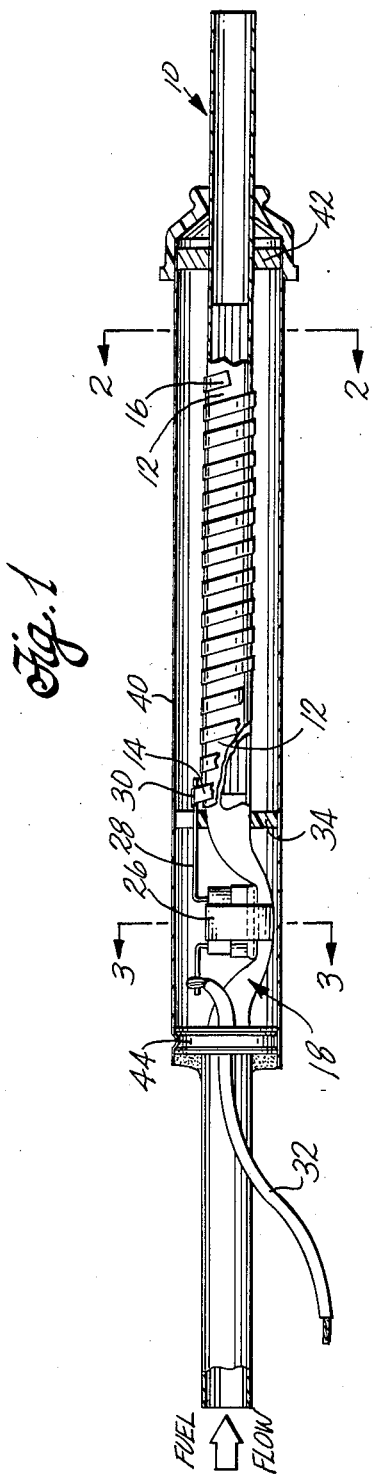

THERMOSTATICALLY CONTROLLED IN-LINE DIESEL FUEL HEATER USING A BIMETAL DISC THERMOSTAT

CROSS-REFERENCE TO RELATED APPLICATIONS

This is a continuation of abandoned application Ser. No. 07/089,227, filed Aug. 25, 1987.

FIELD OF THE INVENTION

This invention relates to fuel heaters, and more particularly, to diesel fuel heaters for vehicles engines.

BACKGROUND OF THE INVENTION

Diesel fuel for engines in cars and trucks, for example, usually contains a material that tends to precipitate out as a solid wax at lower ambient temperatures. This wax restricts flow, clogs fuel filters and fuel injectors, and makes starting and running difficult. It is therefore desirable to heat the fuel sufficiently to dissolve the wax and keep it in solution before the fuel is filtered and injected. Heaters for this purpose have been developed and are in use. One such heater is described in U.S. Pat. No. 4,424,422, assigned to the same assignee as the present invention. Heat is applied to the fuel as it flows through the fuel line by an electrical resistance heater when the temperature of the fuel drops below a predetermined temperature at which wax precipitation occurs. The heater is automatically turned off when the ambient temperature of the fuel rises above such temperature.

SUMMARY OF THE INVENTION

The present invention is directed to an improved fuel heater that can be operated at higher input power levels, that is substantially simpler and more compact in design, less costly to manufacture, and yet more reliable in performance. This is achieved by utilizing a metal tube adapted to be connected in series with a fuel line through which diesel fuel normally flows. A resistance heater element is wrapped about a first section of the tube in thermal contact with the tube for heating the fuel as it flows through the tube. The wall of the tube is flattened to reduce the cross-sectional area of the tube and increase the flow rate at a position upstream of the heater. A thermostatic switch is provided of the type having a bimetalic disk which snaps over center as the disk heats above and cools below a predetermined temperature. The disk is mounted on the tube closely adjacent to the flattened wall when it is held at the temperature of the fuel flowing through the tube. In the event that fuel stop flowing, the metal tube provides a thermal feedback from the heater to the disk to actuate the switch and turn off the heater.

BRIEF DESCRIPTION OF THE DRAWINGS

For a better understanding of the invention, reference should be made to the accompanying drawings, wherein:

FIG. 1 is an elevational view, partly in section, of the heater;

FIG. 2 is a cross-sectional view taken substantially on the line 2—2 of FIG. 1; and FIG. 3 is cross-sectional view taken substantially on the line 3—3 of FIG. 1.

DETAILED DESCRIPTION

Referring to the drawings, there is shown a section of metal pipe 10 adapted to be inserted in the fuel line for transporting diesel oil to a vehicle engine, for example. A first portion of the pipe is wrapped with a thin layer of electrical insulation 12. A ribbon 14 of electrical resistance heater material, such as nichrome, is then wound in a helix around the first portion of pipe over the insulation layer. One end of the heater ribbon is welded to the metal pipe at 16 to provide a "ground" connection.

A second portion of the pipe located upstream of the first portion is bent and formed into a shallow U-shaped section 18. Normal flow of fuel is through the second portion of the pipe to the first portion so that the fuel passes through the U-shaped section before reaching the heater. The center or bight portion of the U-shaped pipe section 18 is flattened, as indicated at 20, to form a flat surface that is substantially wider than the diameter of the pipe. The flattened wall of the pipe reduces the cross-sectional thickness of the fuel passage to less than half the normal diameter of the passage.

Nested in the U-shaped section 18 is a thermostatic switch 22. This switch is of a commercially available design utilizing a bimetalic disk 24 as the temperature sensing element. The disk is dish shaped and acts to pope over center, from a concave to a convex shape, when the temperature of the disk passes a predetermined critical temperature for which it is calibrated. The disk operates electrical switch contacts (not shown) when it pops over center to make or break an electrical circuit for the present invention, a thermostatic switch is selected having a critical temperature that is slightly above the temperature at which the wax goes out of solution from diesel fuel. The thermostatic switch 22 is mounted on the flattened wall 20 of the pipe by a suitable strap 26 extending around the pipe and the housing of the switch 22.

The switch 22 is electrically connected in series with the heater 14 by a lead 28 secured to the ungrounded end of the heater ribbon 14, as indicated at 30. A conductor lead 32 connects the switch 22 to a power source (not shown), such as a battery. When the vehicle is in operation and power is applied to the lead 32, if the ambient temperature of the fuel is below the critical temperature, the switch connects the heater to the power source. The heater then applies heat to the fuel to raise its temperature above the critical level to keep the wax in solution.

As long as the ambient temperature of the incoming fuel is below the critical level, the heater remains on. The thermostatic switch is thermally isolated from the heater by the shape of the pipe and increased flow velocity of the fuel through the flattened pipe at the thermostatic switch. Also a plastic bushing 34 further insulates the heater from the switch. However, if flow is interrupted while the heater is on, thermal feedback by conduction through the metal pipe and through the static fluid will raise the temperature of the thermostatic switch above the critical temperature, interrupting power to the heater. Thus the present invention, by the shaping of the tube, and the type and mounting of the thermostatic switch, insures that the heater remains on when fuel is flowing at a temperature below the critical level, and yet cuts off if flow is interrupted even though the fuel remains below the critical temperature.

Heat transfer between the heater and fuel is enhanced by a deflector 38 (see FIG. 3) mounted in the first portion of the pipe 10 at the heater. The deflector is made of heat conducting metal in contact with the inner wall surface of the pipe. Grooves or channels 39 in the deflector form fluid passages with the surrounding pipe. By increasing the surface area in contact with the fuel, the deflector improves the heat transfer to the flowing oil.

The entire assembly is enclosed in a coaxial tubular housing or cover 40. The cover is mounted on the pipe at one end by a metal bushing and heat sink 42. The other end of the housing 40 is mounted on the pipe by a plastic bushing 44. Thus a self-contained fuel heater assembly is provided which, unlike the above-identified prior art heater, utilizes an unexpensive commericially available thermostat with snap-action contacts to activate the heater when fuel is flowing through the pipe at an ambient temperature below a predetermined level.

What is claimed is:

1. A fuel heater for diesel engine fuel line conducting a diesel fluid in which wax precipitates below a predetermined ambient temperature comprising:

a metal pipe section for transporting a fluid, a resistance heater strip in thermal contact with a first portion of the pipe section, a thermostatic switch connected in series with the resistance heater and being mounted on a second portion of the pipe in heat sensing relationship to the pipe, the second portion of the pipe being upstream of the first portion of the pipe in relation to the normal direction of fluid flow through the pipe, the second portion having a pipe wall that is flattened to less than half the normal diameter of the pipe to reduce the cross-sectional area of the pipe, the thermostatic switch having a heat sensitive bimetal disk that snaps over center to open the switch as the disk is heated and to close the switch as the disk is cooled about a predetermined reference temperature, the disk being mounted to said flattened pipe wall, the thermostatic switch being held below said reference temperature by fluid flowing past the flattened pipe wall at an ambient fluid temperature below the level at which wax forms in the fluid but rising above said reference temperature when the fluid stops flowing and the heater is on because of conductive heat transfer in the pipe between the heater and the switch.

2. Apparatus of claim 1 wherein said second portion of the pipe includes a U-shaped section, said flattened pipe wall with the thermostatic switch mounted thereon being positioned in said section.

3. Apparatus of claim 2 further including a fluid deflector made of metal mounted in the first portion of the pipe in contact therewith, the deflector in radial cross-section dividing the first portion of the pipe into a plurality of fluid passages for increasing the surface area in contact with the fluid and improving heat transfer from the heater to the fluid.

4. A fuel heater for diesel fuel that has a was precipitate below a predetermined temperature comprising:

a substantially straight section of metal pipe for transporting fuel, the metal pipe section having a U-shaped section formed therein, the cross-sectional thickness of the fuel passage in the pipe in the U-shaped section being less than half the cross-sectional thickness of the pipe outside the U-shaped bend, the U-shaped section having a bight portion that is flattened to form a substantially planar surface, a thermostatic switch having a heat sensitive bimetal disk that snaps over center to open the switch as the disk is heated to a predetermined temperature and that snaps over center to close the switch as the disk is cooled below the predetermined temperature, the predetermined temperature being slightly higher than the temperature at which wax precipitates from the fuel, the switch being inserted in said U-shaped section and mounted on said planar surface, and an electrical heater in thermal contact with the straight section of pipe downstream of the U-shaped section, the heater being connected electrically in series with said switch, diesel fuel in the U-shaped section controlling the temperature of the bimetal disk when the fuel is flowing and the heater controlling this temperature by thermal conduction through the pipe when the fuel is not flowing.

5. The apparatus of claim 4 further including a fluid deflector mounted in the straight section of the pipe for deflecting the fluid against the walls of pipe and increasing the surface area in contact with the fluid.

6. Apparatus of claim 5 wherein the fluid deflector is made of metal and directly engages the wall of the pipe.

* * * * *

UNITED STATES PATENT AND TRADEMARK OFFICE
CERTIFICATE OF CORRECTION

PATENT NO. : 4,892,996

DATED : January 9, 1990

INVENTOR(S) : James L. Mertes

It is certified that error appears in the above-identified patent and that said Letters Patent is hereby corrected as shown below:

```
Column 1, line 53, change "when" to -- where --.
Column 1, line 55, change "stop" to -- stops --.

Column 2, line 29, change "pope" to -- pop --.
Column 2, line 34, change "circuit for" to
          -- circuit. For --.
```

In the Claims

```
Column 4, line 14, change was" to -- wax --.
```

Signed and Sealed this

Second Day of July, 1991

*Attest:*

HARRY F. MANBECK, JR.

*Attesting Officer*    *Commissioner of Patents and Trademarks*